US012560226B2

(12) United States Patent
Li et al.

(10) Patent No.: US 12,560,226 B2
(45) Date of Patent: Feb. 24, 2026

(54) LINEAR DRIVE MECHANISM

(71) Applicants: AAC Acoustic Technologies (Shanghai) Co., Ltd., Shanghai (CN); Beijing Xiaomi Robot Technology Co., Ltd., Beijing (CN)

(72) Inventors: Chunjiang Li, Shanghai (CN); Yuntong Li, Shanghai (CN); Bing Xie, Shanghai (CN); Chuiyou Zhou, Shanghai (CN); Liang Jiang, Shanghai (CN)

(73) Assignees: AAC Acoustic Technologies (Shanghai) Co., Ltd., Shanghai (CN); Beijing Xiaomi Robot Technology Co., Ltd., Beijing (CN)

( * ) Notice: Subject to any disclaimer, the term of this patent is extended or adjusted under 35 U.S.C. 154(b) by 0 days.

(21) Appl. No.: 18/744,590

(22) Filed: Jun. 14, 2024

(65) Prior Publication Data

US 2025/0314290 A1      Oct. 9, 2025

Related U.S. Application Data

(63) Continuation of application No. PCT/CN2024/089030, filed on Apr. 22, 2024.

(30) Foreign Application Priority Data

Apr. 8, 2024    (CN) .......................... 202410417647.8

(51) Int. Cl.
     *F16H 25/24*        (2006.01)
     *F16H 25/20*        (2006.01)
     (Continued)

(52) U.S. Cl.
     CPC ........... *F16H 25/2015* (2013.01); *G01B 7/30* (2013.01); *G01D 5/145* (2013.01); *H02K 7/06* (2013.01);
     (Continued)

(58) Field of Classification Search
     CPC ......... F16H 25/2015; F16H 2025/2078; F16H 25/2454
     See application file for complete search history.

(56) References Cited

U.S. PATENT DOCUMENTS 10,050,487 B2 * 8/2018 Biwersi ................. H02K 3/522
10,243,427 B2 * 3/2019 Fukunaga ............. H02K 1/278
(Continued)

*Primary Examiner* — Gregory Robert Weber
(74) *Attorney, Agent, or Firm* — Wiersch Law Group

(57)              ABSTRACT

The present application provides a linear drive mechanism, including a casing, a front cover and a rear cover fixed at opposite ends of the casing, a stator arranged in the casing, a hollow rotor rotatably connected to the stator, and a ball screw including a screw nut and a center screw arranged in the screw nut. The screw nut is provided with first ball grooves recessed inwardly and threadedly spiraled at intervals, and the center screw is provided with a second ball grooves that are spiraled. The ball screw further includes a plurality of balls sandwiched between the first ball grooves and the second ball grooves to form a rolling connection between the screw nut and the screw body. The linear drive mechanism can realize real-time control and has good reliability, high efficiency, more balanced driving force, low overall height, small length, friendly mounting size and simple structure.

13 Claims, 7 Drawing Sheets

A–A

(51) Int. Cl.

| | | |
|---|---|---|
| *G01B 7/30* | (2006.01) | |
| *G01D 5/14* | (2006.01) | |
| *H02K 7/06* | (2006.01) | |
| *H02K 11/215* | (2016.01) | |

(52) U.S. Cl.
CPC .... *H02K 11/215* (2016.01); *F16H 2025/2031* (2013.01); *F16H 2025/2078* (2013.01); *F16H 25/2454* (2013.01); *H02K 2211/03* (2013.01)

(56) References Cited

U.S. PATENT DOCUMENTS

| | | | | |
|---|---|---|---|---|
| 10,461,606 B2 * | 10/2019 | Ognibene | ............ | B62D 5/0403 |
| 10,830,320 B2 * | 11/2020 | Matsuto | .............. | F16H 25/2228 |
| 10,919,159 B2 * | 2/2021 | Kassow | ............... | B25J 19/0004 |
| 12,088,159 B2 * | 9/2024 | Soler | ........................ | H02K 1/27 |
| 12,214,432 B2 * | 2/2025 | McDonald | ........... | B23D 59/006 |

* cited by examiner

A–A

B–B

C-C

LINEAR DRIVE MECHANISM

CROSS-REFERENCE TO RELATED APPLICATIONS

This application is a continuation of International Application No. PCT/CN2024/089030, filed on Apr. 22, 2024, which claims priority to Chinese patent application No. 202410417647.8, filed on Apr. 8, 2024. The entire contents of these applications are incorporated herein by reference in their entirety.

TECHNICAL FIELD

The present application relates to the technical field of linear drive, in particular to a linear drive mechanism.

BACKGROUND

Currently, humanoid robots are automated machines that can assist or even replace humans in performing dangerous, heavy, and complex tasks. The fingers of humanoid robots are crucial for executing actions and completing tasks. However, due to constraints such as space and energy efficiency, more stringent requirements need to be placed on their linear actuators. Specifically, linear actuators need to evolve towards higher integration, smaller size, higher load-bearing capacity, and faster response.

In the related art, linear actuators mainly employ brushed motors and multi-stage planetary gear structures. In this type of linear actuator, the force transmission of the brushed motor undergoes significant hysteresis after multiple stages of reduction, leading to poor real-time control performance. Additionally, the efficiency decreases rapidly with an increase in the number of stages in the transmission. Moreover, brushed motors themselves suffer from reliability issues, such as unbalanced three-phase resistance and torque due to contact problems with brushes.

In summary, the linear actuator in the related art has the problems of poor real-time control performance and reliability, low efficiency, and unbalanced driving force.

Therefore, it is necessary to provide a new linear drive mechanism to solve the above technical problems.

SUMMARY

An object of the present application is to provide a linear drive mechanism, aiming at solving the problems of poor real-time control performance and reliability, low efficiency, and unbalanced driving force of a linear actuator in the related technology.

In order to achieve the above purpose, the present application provides a linear actuator comprising a casing with openings at both ends; a front cover and a rear cover fixed at opposite ends of the casing; a stator arranged in the casing; a hollow rotor arranged in the stator and rotatably connected to the stator; and a ball screw arranged in the rotor, comprising a hollow screw nut fixed in the rotor, and a center screw arranged on an inner peripheral side of the screw nut and arranged through the front cover; wherein the screw nut is rotatably connected to the casing and the center screw;

wherein the inner peripheral side of the screw nut is provided with first ball grooves that are recessed inwardly and threadedly spiraled at intervals, and an outer peripheral side of the center screw is provided with second ball grooves that are recessed inwardly, threadedly spiraled, and provided correspondingly to the first ball grooves; the ball screw further comprises a plurality of balls, and the plurality of the balls are sandwiched between the first ball grooves and the second ball grooves in order to form a rolling connection between the screw nut and the center screw.

In one embodiment, the stator comprises a stator core fixed on a side of the casing close to the rotor and a coil winding fixed in the stator core; wherein the coil winding is spaced apart from the rotor; the coil winding is formed by a plurality of coils stackedly bonded and is in the shape of a circle, and the coil winding is configured to drive the rotor to rotate after being energized;

the stator is configured to drive the rotor to rotate the screw nut, to drive the center screw to perform a linear telescopic motion.

In one embodiment, the stator core is an annular magnetic steel sleeve; or the stator core is formed by stacking a plurality of silicon steel sheets by means of bonding or riveting.

In one embodiment, the stator core is a toothless groove iron core.

In one embodiment, the rotor is of a magnet-conducting hollow shaft structure, and a permanent magnet mounted on the magnet-conducting hollow shaft structure is of a radial four-pole magnetic ring structure or a radial six-pole magnetic ring structure.

In one embodiment, the rotor is of a magnet-conducting hollow shaft structure; a permanent magnet mounted on the magnet-conducting hollow shaft structure is of a magnetic sheet structure, and the magnetic sheet structure is bonded to the magnet-conducting hollow shaft structure to form a radial four-pole magnetic field or a six-pole magnetic field.

In one embodiment, the rotor is made of neodymium-iron-boron material having a performance grade greater than or equal to N45H.

In one embodiment, the center screw comprises a screw body arranged within the screw nut and a protruding end formed by protruding and extending from an end of the screw body close to the front cover and arranged through the front cover.

In one embodiment, the linear drive mechanism further comprises a control board fixed to the casing and the front cover, and spaced apart from the stator; a linear position sensor electrically connected to the control board; and a rectangular stopper fixedly sleeved on the protruding end and abutted against the screw body; wherein the linear position sensor is configured to collect linear movement data of the stopper.

In one embodiment, the linear position sensor comprises a linear sensor magnet fixed to a side of the stopper close to the control board and a first Hall sensor fixed to a side of the control board close to the center screw and located within a magnetic field range of the linear sensor magnet; or the linear position sensor comprises an elastic piece provided on a side of the stopper close to the control board and conductor resistances fixed on a side of the control board close to the center screw and in the form of an elongated strip; wherein the elastic piece is slidable with the stopper on a surface of the conductor resistances, and a linear extending length of the protruding end is collected by the conductor resistances at different positions.

In one embodiment, the linear drive mechanism further comprises a control board and an angular position sensor; wherein the angular position sensor is configured to collect angular information of a motor comprising the stator and the rotor; the control board is fixed to the casing and the front cover, and spaced apart from the stator; the angular position sensor comprises a second Hall sensor fixed to the control board and located within a magnetic field of the rotor; and the second Hall sensor is configured to collect the angular information of the motor comprising the stator and the rotor.

In one embodiment, the linear drive mechanism further comprises an angular position sensor, wherein the angular position sensor is configured to collect angular information of a motor comprising the stator and the rotor; the angular position sensor comprises a collecting portion fixed to a side of the rear cover close to the screw nut and a rotating portion fixed to a side of the screw nut close to the rear cover; the collecting portion and the rotating portion are provided opposite and spaced apart.

In one embodiment, there are two Hall sensor chips in the angular position sensor, wherein the two Hall sensor chips are located at one end of the control board away from the linear drive mechanism and in a radial direction of the rotor, and the angular position of the rotor is identified by sensing an angular phase signal of a magnetic field of a rotor magnet.

In one embodiment, the rotor is provided with a brake at an end of the rotor, which is configured to provide a blocking torque when a motor comprising the stator and the rotor is blocked.

In one embodiment, the casing is of a structure with openings at both ends; and the casing, the front cover, and the rear cover are connected into a single unit by bolts.

In one embodiment, the casing comprises a front section casing and a rear section casing; the rear section casing is fused into the rear cover as a single unit; and the front cover, the front section casing, and the rear cover fusing the rear section casing are connected into a single unit by bolts.

Compared with the related art, the linear drive mechanism of the present application realizes linear drive by adopting a motor including a stator and a rotor coupled with a ball screw, and the limited ball screw includes a hollow screw nut fixed in the rotor, a center screw provided on the inner peripheral side of the screw nut and arranged through the front cover, and a plurality of balls. The plurality of balls are sandwiched between the first ball grooves and the second ball grooves so as to form a rolling connection between the screw nut and the center screw. This design can realize real-time control of the linear drive mechanism with good reliability, high efficiency, and more balanced driving force. In addition, it can make the linear drive mechanism with low overall height, small length, friendly mounting size, and simple structure.

BRIEF DESCRIPTION OF THE DRAWINGS

In order to more clearly illustrate the technical solutions in the embodiments of the present application, the accompanying drawings to be used in the description of the embodiments will be briefly introduced below. Obviously, the accompanying drawings in the following description are only some embodiments of the present application, and for the person of ordinary skill in the field, other accompanying drawings can be obtained based on these drawings without putting in creative labor.

In the figures, 100, linear drive mechanism; 1, casing; 2, front cover; 3, rear cover; 4, stator; 41, stator core; 42, coil winding; 5, rotor; 6, ball screw; 61, screw nut; 611, first ball groove; 62, center screw; 621, center screw body; 622, second ball groove; 623, protruding end; 63, ball; 7, control board; 8, linear position sensor; 81, linear sensor magnet; 82, first Hall sensor; 83, elastic piece; 84, conductor resistance; 9, stopper; 91, groove; 10, angular position sensor; 101, second Hall sensor; 102, collecting portion; 103, rotating portion; 104, magnet holder; 11, first bearing; 12, second bearing.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by a person of ordinary skill in the art without making creative labor fall within the protection scope of the present application.

Embodiment One

Figure 1:
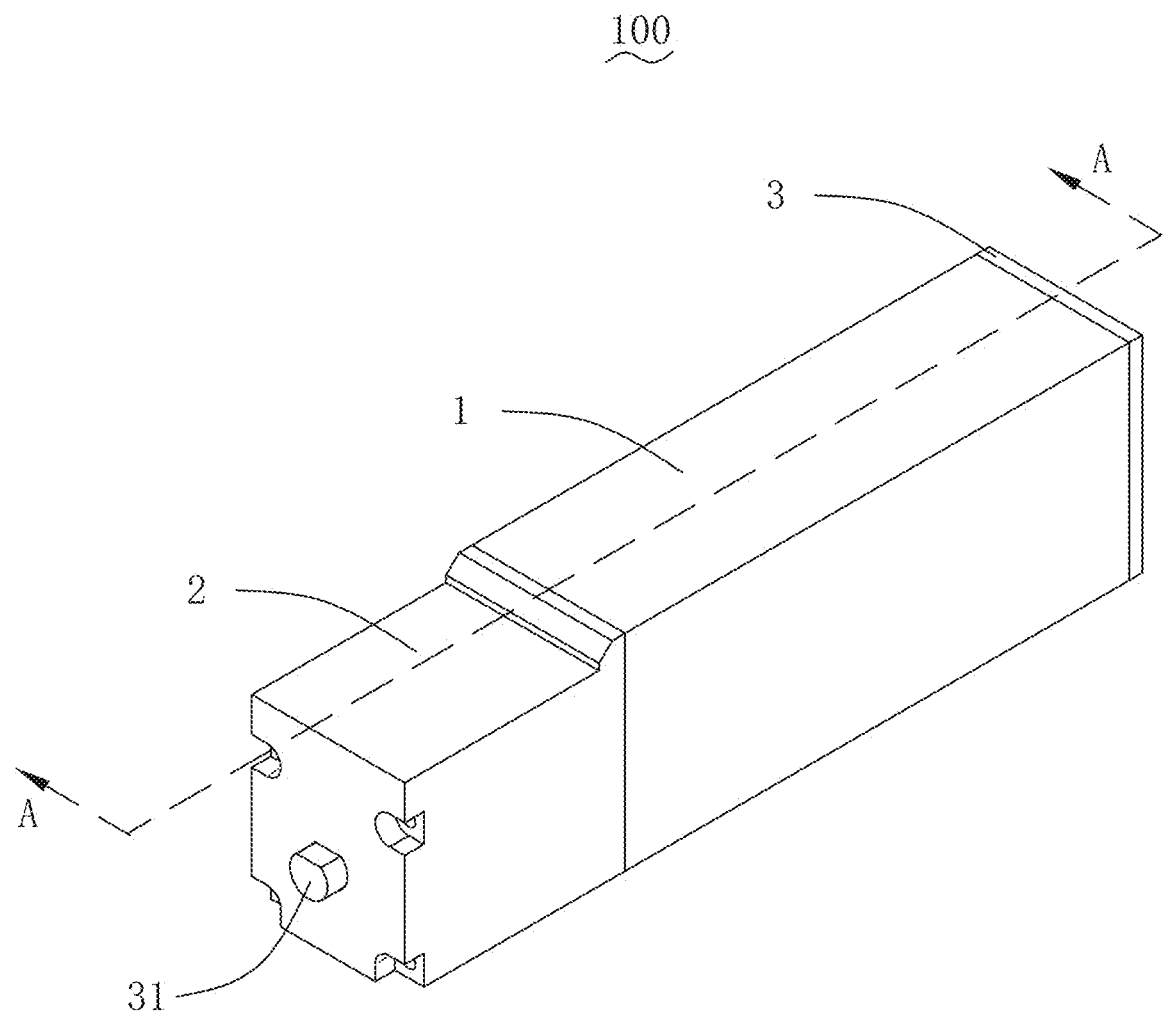
FIG. 1 shows a three-dimensional structural schematic diagram of a linear drive mechanism according to Embodiment One of the present application.
Figure 2:
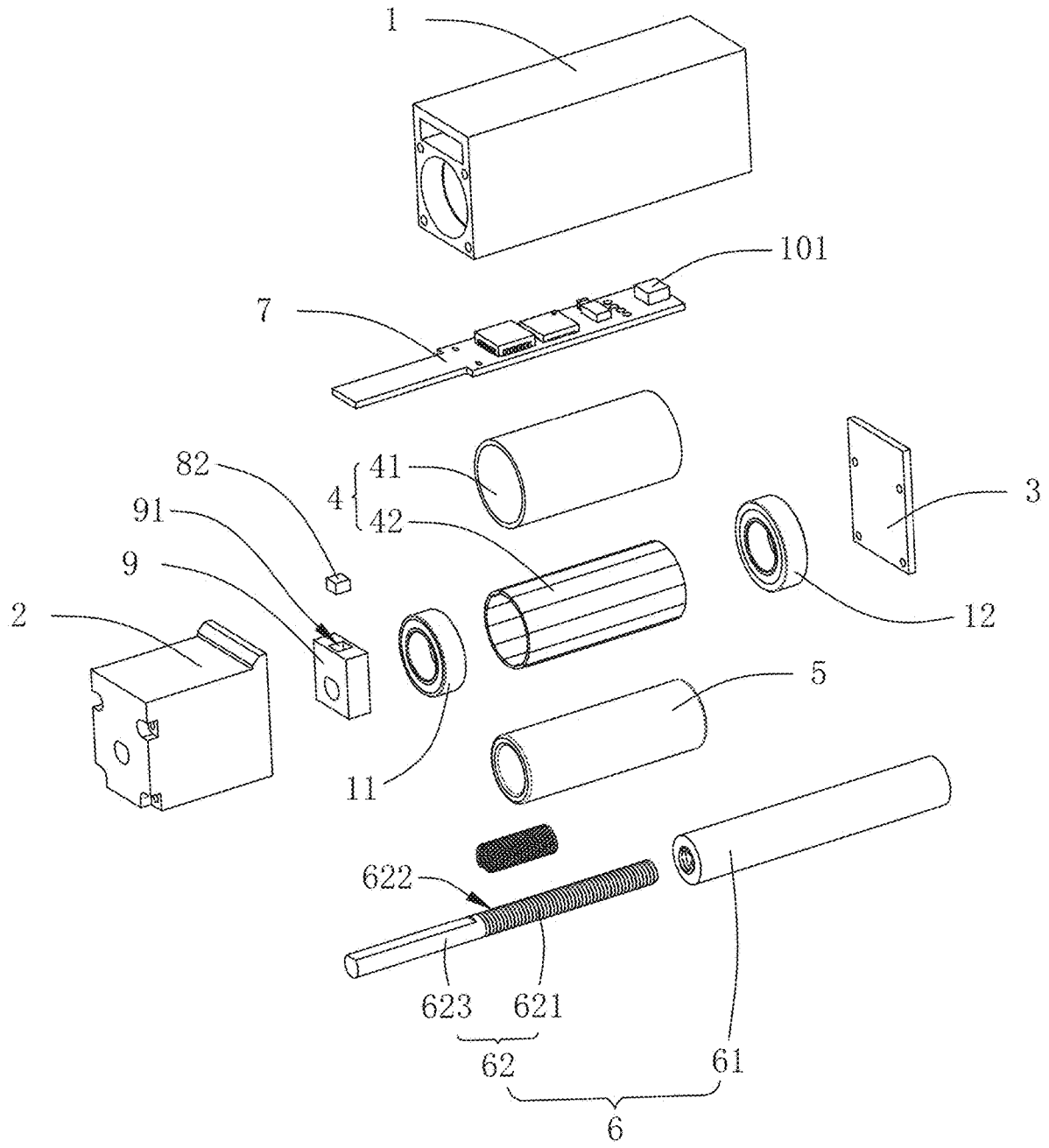
FIG. 2 shows a three-dimensional structural exploded view of the linear drive mechanism according to Embodiment One of the present application.
Figure 3:
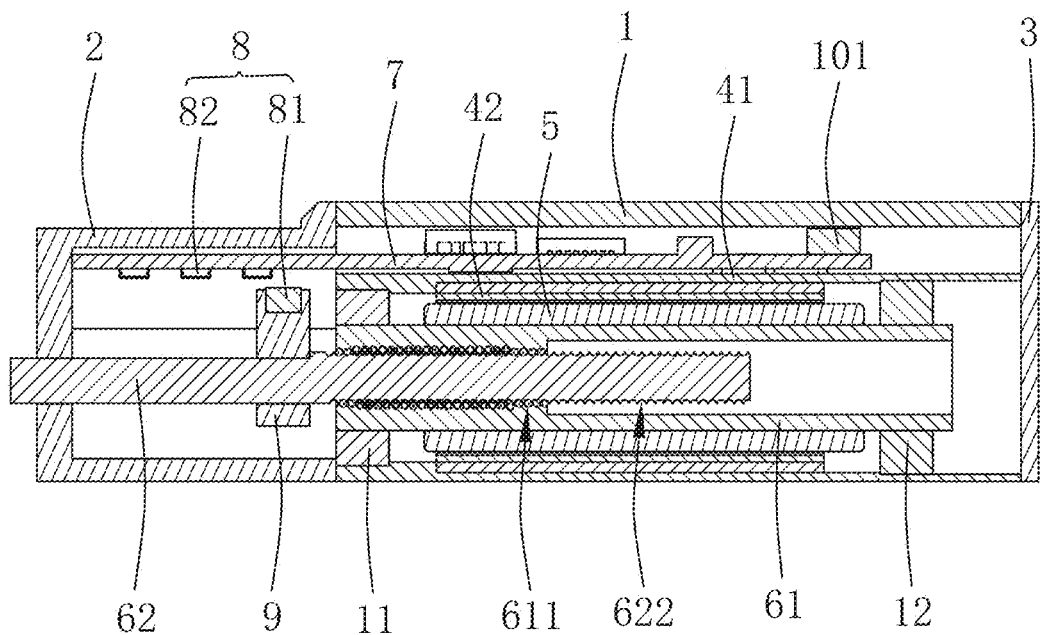
FIG. 3 shows a sectional view along line A-A of FIG. 1.

As shown in FIGS. 1 to 3, embodiments of the present application provides a linear drive mechanism 100, including a casing 1 with openings at both ends, a front cover 2 and a rear cover 3 respectively fixed to opposite ends of the casing 1, a stator 4 arranged the casing 1, and a hollow rotor 5 arranged the stator 4 and rotatably connected to the stator 4.

The casing 1 is a structure with openings at both ends, and the casing 1, the front cover 2, and the rear cover 3 are connected into a single unit by bolts.

The casing 1 includes a front section casing and a rear section casing. Four corners of the front section casing and the rear section casing are provided with round holes and fixed in series by long bolts. Of course, according to the actual demand, the rear section casing can be integrated into the rear cover 3, and the front cover 2, the front section casing, and the rear cover 3 integrated with the rear section casing can be connected together as a whole by bolts. Alternatively, the front section casing can be integrated into the front cover 2, and the front cover 2 integrated with the front section casing, the rear section casing, and the rear cover 3 can be connected together as a whole by bolts.

The stator 4 includes a stator core 41 fixed on a side of the casing 1 close to the rotor 5, and a coil winding 42 fixed inside the stator core 41. The coil winding 42 is spaced apart from the rotor 5. The coil winding 42 is formed by a plurality of coils stackedly bonded and is in the shape of a circle, and the coil winding 42 drives the rotor 5 to rotate after being energized. In this embodiment, the coil winding 42 is formed by six coils stackedly bonded and is in the shape of a circle, i.e., the coil winding 42 is in a hollow structure.

The stator core 41 is a toroidal magnet-conducting steel sleeve, or the stator core 41 is formed by stacking a plurality of silicon steel sheets by means of bonding or riveting, and the stator core 31 is a toothless groove iron core.

The rotor 5 is of a magnet-conducting hollow shaft structure. A permanent magnet mounted on the magnet-conducting hollow shaft structure is of a radial four-pole magnetic ring structure or a radial six-pole magnetic ring structure, or a permanent magnet mounted on the magnet-conducting hollow shaft structure is of a magnetic sheet structure, and the magnetic sheet structure is bonded to the magnet-conducting hollow shaft structure to form a radial four-pole magnetic field or a six-pole magnetic field.

An end of the rotor 5 (magnet-conducting hollow shaft structure) is provided with a braking device, which is configured to provide a blocking torque when the motor including the stator 4 and the rotor 5 is blocked, in order to avoid the temperature of the motor rising due to the long-term blocking of the motor, and also to reduce the energy consumption of the motor.

The rotor 5 is made of a neodymium-iron-boron material having a performance grade greater than or equal to N45H.

Specifically, the linear drive mechanism 100 further includes a ball screw 6 suited within the rotor 5.

The ball screw 6 includes a hollow screw nut 61 fixed in the rotor 5, and a center screw 62 arranged on an inner peripheral side of the screw nut 61 and arranged through the front cover 2, and the screw nut 61 is rotatably connected to the casing 1 and the center screw 62.

The inner peripheral side of the screw nut 61 is provided with first ball grooves 611 that are recessed inwardly and threadedly spiraled at intervals, and the outer peripheral side of the center screw 62 is provided with second ball grooves 622 that are recessed inwardly, threadedly spiraled and are provided correspondingly to the first ball grooves. The ball screw 6 further includes a plurality of balls 63, which are clamped between the first ball grooves 611 and the second ball grooves 622 to enable the screw nut 61 to be rotatably connected to the casing 1 and the second ball grooves 622.

The stator 4 drives the rotor 5 to rotate the screw nut 61, thereby causing the screw nut 61 to rotate to drive the center screw 62 to realize a linear telescopic movement.

The center screw 62 includes a screw body 621 arranged in the screw nut 61 and a protruding end 623 formed by protruding and extending from an end of the screw body 621 close to the front cover 2 and arranged through the front cover 2. The second ball grooves 622 are arranged on an outer peripheral side of the screw body 621.

Specifically, the linear drive mechanism 100 further includes a control board 7 fixed to the casing 1 and the front cover 2 and spaced apart from the stator 4, a linear position sensor 8 electrically connected to the control board 7, and a rectangular stopper 9 fixedly sleeved on the protruding end 623 and abutted against the screw body 621. The linear position sensor 8 is configured to collect linear movement data of the stopper 9.

The casing 1 is provided with a groove formed by an internal depression close to one end of the front cover 2, and the control board 7 located at the cover is inserted into the groove.

The linear position sensor 8 includes a linear sensor magnet 81 fixed to a side of the stopper 9 close to the control board 7 and a first Hall sensor 82 fixed to a side of the control board 7 close to the center screw 62 and located within a magnetic field range of the linear sensor magnet 81. There are one or more linear sensor magnets 81. In this embodiment, there are three linear sensor magnets 81 that are spaced apart from each other. The stopper 9 is provided with an inwardly recessed recess 91 on a side close to the control board 7, and the linear sensor magnets 81 are mounted in the recess 91. Of course, according to practical needs, the linear sensor magnet 81 may also be directly glued to the protruding end 623 and located at the original position of the stopper 9 to save costs.

Specifically, the linear drive mechanism 100 further includes an angular position sensor 10, which is configured to collect the angular information of the motor including the stator 4 and the rotor 5. The angular position sensor 10 includes a second Hall sensor 101 fixed to the control board 7 and is located within the magnetic field of the rotor 5. The second Hall sensor 101 is configured to collect the angular information of the motor including the stator 4 and the rotor 5. There are one or more linear sensor magnets 81. In this embodiment, the number of linear sensor magnet 81 is one.

Specifically, the linear drive mechanism 100 further includes a first bearing 11 and a second bearing 12. The first bearing 11 and the second bearing 12 are sleeved and fixed to the two ends of the screw nut 61, respectively. An outer peripheral side of the first bearing 11 and an outer peripheral side of the second bearing 12 are both fixed inside the casing 1, and the second bearing 12 is close to the rear cover 3.

The second Hall sensor 101 is located above a region between the stator 4 and the second bearing 12.

The linear drive mechanism 100 of this embodiment is applied to a dexterous finger or joint of a robot.

The linear drive mechanism 100 of this embodiment realizes linear drive by adopting a motor including a stator 4 and a rotor 5 in combination with a ball screw 6. The ball screw 6 includes a hollow screw nut 61 fixed in the rotor 5, a center screw 62 provided on the inner peripheral side of the screw nut 61 and arranged through the front cover 2, and a plurality of balls 63. The plurality of balls 63 are sandwiched between the first ball grooves 611 and the second ball grooves 622 so as to form a rolling connection between the threaded rod nut 61 and the threaded rod body 621. This design can realize real-time control of the linear drive mechanism 100 with good reliability, high efficiency, and more balanced driving force. In addition, it can also make the linear drive mechanism with low overall height, small length, friendly mounting size, and simple structure. The stator 4 is designed with a toothless groove structure, meaning the motor composed of the stator 4 and the rotor 5 has a toothless groove torque. This design minimizes jitter during speed regulation, ensures stable driving force, and provides stable thrust with minimal fluctuation within the required driving length. The drive control is straightforward. The rotor 5 is configured as a magnetic ring structure made of permanent magnets, resulting in a simple structure with no brush friction, allowing for faster dynamic response.

Embodiment Two

Figure 4:
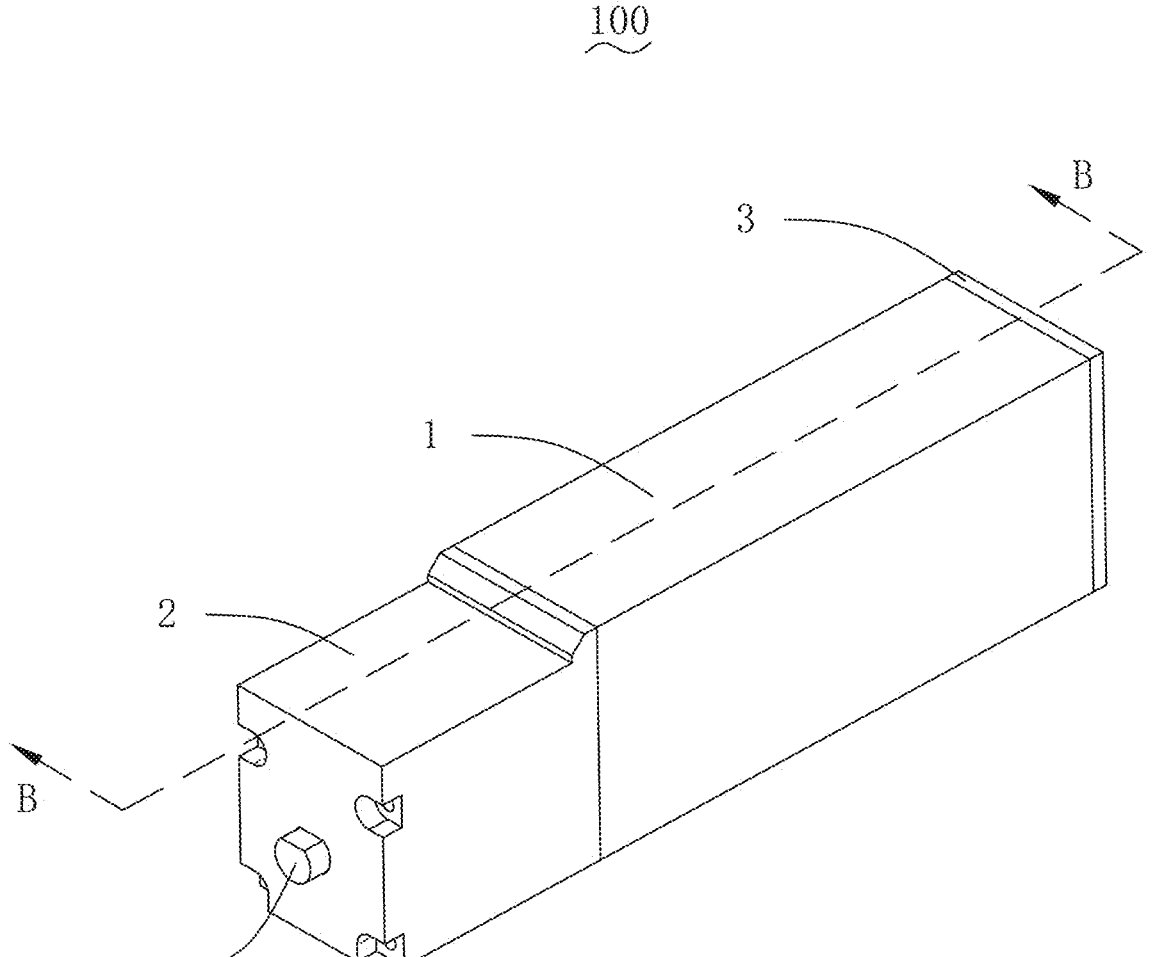
FIG. 4 is a three-dimensional structural schematic diagram of the linear driving mechanism according to Embodiment Two of the present application.
Figure 5:
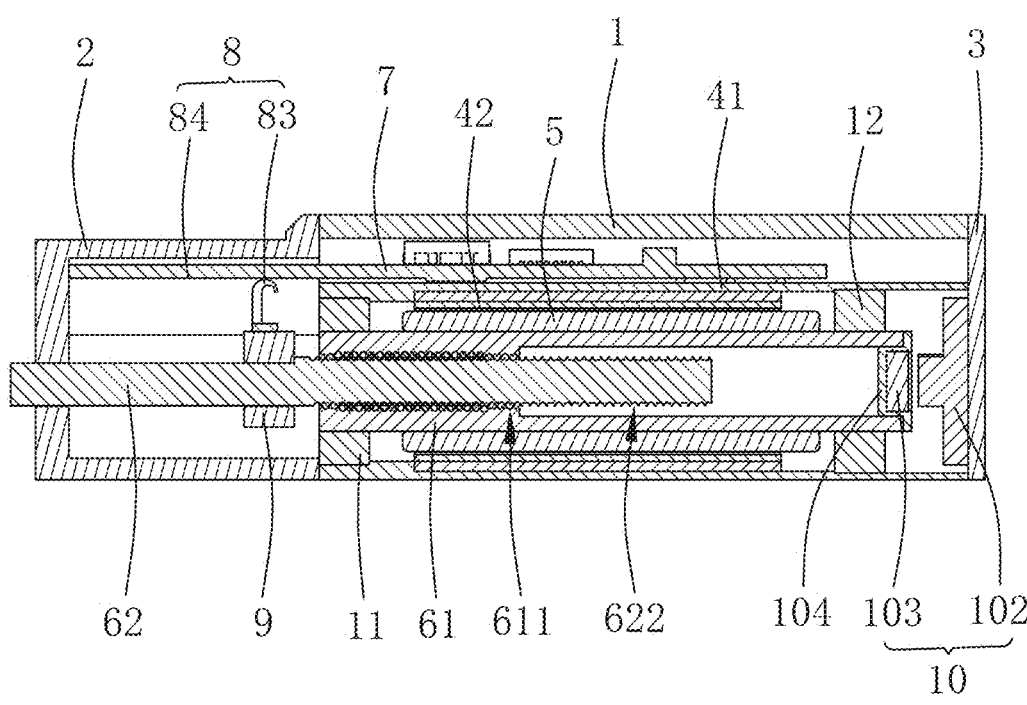
FIG. 5 is a sectional view along line B-B of FIG. 4.

As shown in FIGS. 4 to 5, the first difference between this embodiment and embodiment One is that the linear position sensor 8 includes an elastic piece 83 arranged on a side of the stopper 9 close to the control board 7 and conductor resistances 84 fixed on a side of the control board 7 close to the center screw 62 and in the form of an elongated strip. The elastic piece 83 slides with the stopper 9 on the surface of the conductor resistances 84, and a linear extending length of the protruding end 623 is collected by a difference of the conductor resistances 84 at different positions.

A second difference between this embodiment and embodiment One is that the angular position sensor 10 includes a collecting portion 102 fixed to the side of the rear cover 3 close to the screw nut 61 and a rotating portion 103 fixed to the side of the screw nut 61 close to the rear cover 3. The collecting portion 102 and the rotating portion 103 are provided opposite and spaced apart.

The collecting portion 102 includes an acquisition plate fixed to the rear cover 3 and a sensor fixed to the acquisition plate. The rotating portion 103 includes a magnet holder 104 fixed to the screw nut 61 and an angle sensor magnet (permanent magnet) fixed to a side of the magnet holder 104 close to the rear cover 3.

Embodiment Three

Figure 6:
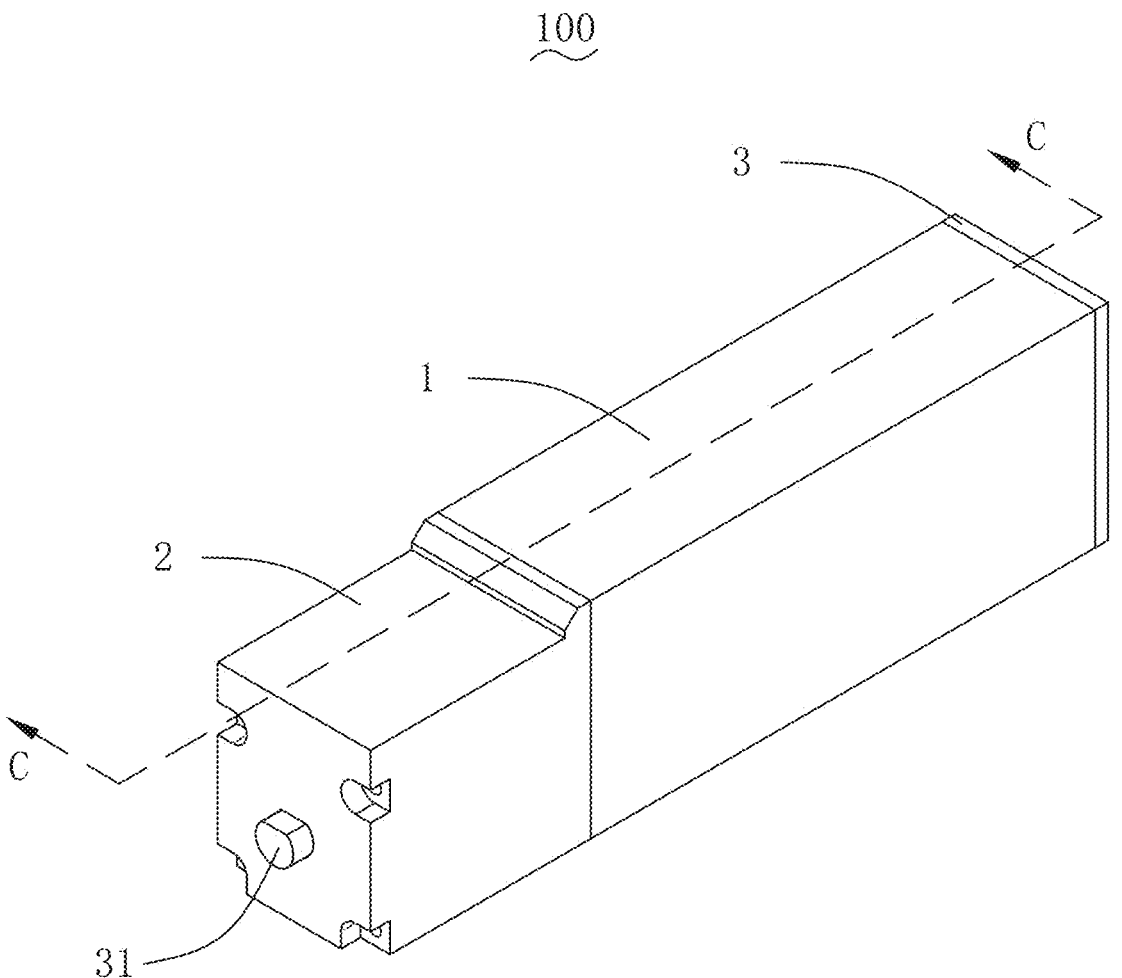
FIG. 6 is a three-dimensional structural schematic diagram of the linear drive mechanism according to Embodiment Three of the present application.
Figure 7:
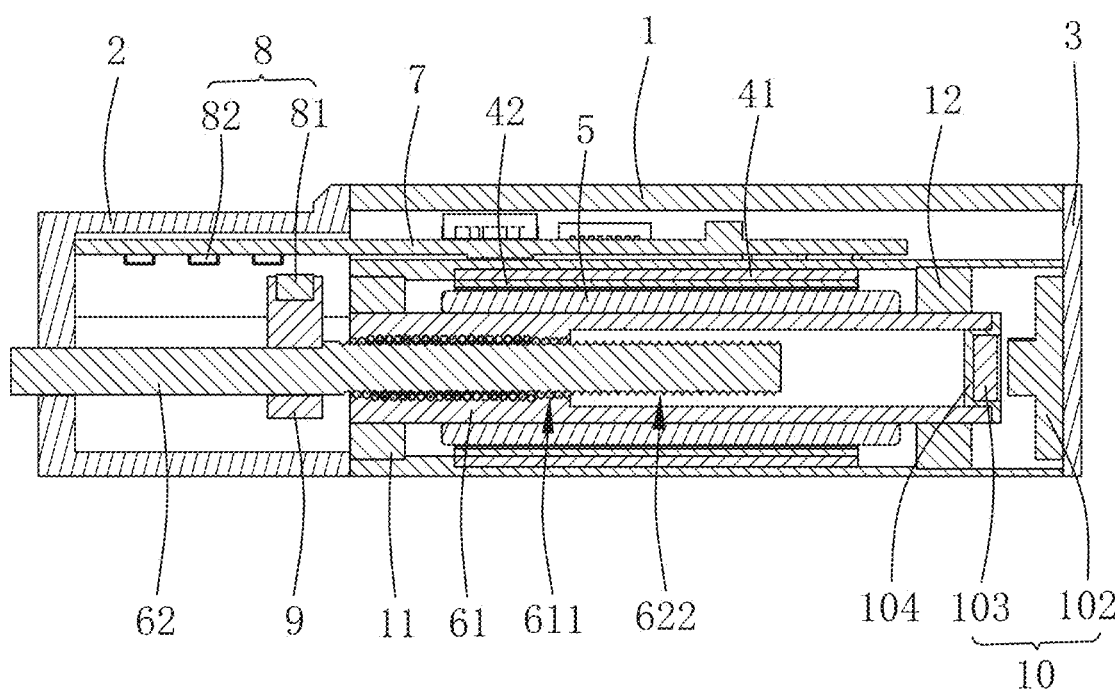
FIG. 7 is a sectional view along line C-C of FIG. 6.

As shown in FIGS. 6 to 7, this embodiment differs from embodiment One in that the angular position sensor 10 includes a collecting portion 102 fixed to a side of the rear cover 3 close to the screw nut 61 and a rotating portion 103 fixed to a side of the screw nut 61 close to the rear cover 3. The collecting portion 102 and the rotating portion 103 are provided opposite and spaced apart.

The collecting portion 102 includes an acquisition plate fixed to the rear cover 3 and a sensor fixed to the acquisition plate. The rotating portion 103 includes a magnet holder 104 fixed to the screw nut 61 and an angle sensor magnet (permanent magnet) fixed to a side of the magnet holder 104 close to the rear cover 3.

In this embodiment, there are two Hall sensor chips in the angular position sensor 10, and the two Hall sensor chips are located at an end of the control board 7 away from the direction of the linear drive mechanism 100 and in the radial direction of the rotor 5, so as to recognize the angular position of the rotor 5 by sensing the angular phase signals of the magnetic field of the rotor 5.

Described above are only some embodiments of the present application, and it should be noted herein that, for those of ordinary skill in the art, improvements may be made without departing from the inventive concept of the present application, but these all fall within the protection scope of the present application.

What is claimed is:

1. A linear drive mechanism, comprising:
a casing with openings at both ends;
a front cover and a rear cover fixed at opposite ends of the casing;
a stator arranged in the casing;
a control board is fixed to the casing and the front cover, and spaced apart from the stator;
a hollow rotor arranged in the stator and rotatably connected to the stator;
an angular position sensor is configured to collect angular information of a motor comprising the stator and the rotor; and
a ball screw arranged in the rotor, comprising:
a hollow screw nut fixed in the rotor; and
a center screw arranged on an inner peripheral side of the screw nut and arranged through the front cover; wherein the screw nut is rotatably connected to the casing and the center screw;
wherein the inner peripheral side of the screw nut is provided with first ball grooves that are recessed inwardly and threadedly spiraled at intervals, and an outer peripheral side of the center screw is provided with second ball grooves that are recessed inwardly, threadedly spiraled, and provided correspondingly to the first ball grooves; the ball screw further comprises a plurality of balls, and the plurality of the balls are sandwiched between the first ball grooves and the second ball grooves in order to form a rolling connection between the screw nut and the center screw;
the stator is configured to drive the rotor to rotate the screw nut, to drive the center screw to perform a linear telescopic motion;
wherein the angular position sensor comprises a second Hall sensor fixed to the control board and located within a magnetic field of the rotor; and the second Hall sensor is configured to collect the angular information of the motor comprising the stator and the rotor.

2. The linear drive mechanism of claim 1, wherein the stator comprises a stator core fixed on a side of the casing close to the rotor and a coil winding fixed in the stator core; wherein the coil winding is spaced apart from the rotor; the coil winding is formed by a plurality of coils stackedly bonded and is in the shape of a circle, and the coil winding is configured to drive the rotor to rotate after being energized.

3. The linear drive mechanism of claim 2, wherein the stator core is an annular magnetic steel sleeve; or
the stator core is formed by stacking a plurality of silicon steel sheets by means of bonding or riveting.

4. The linear drive mechanism of claim 1, wherein the rotor is of a magnet-conducting hollow shaft structure, and a permanent magnet mounted on the magnet-conducting hollow shaft structure is of a radial four-pole magnetic ring structure or a radial six-pole magnetic ring structure.

5. The linear drive mechanism of claim 1, wherein the rotor is of a magnet-conducting hollow shaft structure; a permanent magnet mounted on the magnet-conducting hollow shaft structure is of a magnetic sheet structure, and the magnetic sheet structure is bonded to the magnet-conducting hollow shaft structure to form a radial four-pole magnetic field or a six-pole magnetic field.

6. The linear drive mechanism of claim 1, wherein the center screw comprises a screw body arranged within the screw nut and a protruding end formed by protruding and extending from an end of the screw body close to the front cover and arranged through the front cover; the second ball grooves are arranged on an outer peripheral side of the screw body.

7. The linear drive mechanism of claim 6, further comprising:
a control board fixed to the casing and the front cover, and spaced apart from the stator;
a linear position sensor electrically connected to the control board; and
a rectangular stopper fixedly sleeved on the protruding end and abutted against the screw body;
wherein the linear position sensor is configured to collect linear movement data of the stopper.

8. The linear drive mechanism of claim 7, wherein the linear position sensor comprises a linear sensor magnet fixed to a side of the stopper close to the control board and a first Hall sensor fixed to a side of the control board close to the center screw and located within a magnetic field range of the linear sensor magnet.

9. The linear drive mechanism of claim 7, further comprising an angular position sensor, wherein the angular position sensor is configured to collect angular information of a motor comprising the stator and the rotor; the angular position sensor comprises a collecting portion fixed to a side of the rear cover close to the screw nut and a rotating portion fixed to a side of the screw nut close to the rear cover; the collecting portion and the rotating portion are provided opposite and spaced apart.

10. The linear drive mechanism of claim 9, wherein there are two Hall sensor chips in the angular position sensor, wherein the two Hall sensor chips are located at one end of the control board away from the linear drive mechanism and in a radial direction of the rotor, and the angular position of the rotor is identified by sensing an angular phase signal of a magnetic field of a rotor magnet.

11. The linear drive mechanism of claim 1, wherein an end of the rotor is provided with a brake, which is configured to provide a blocking torque when a motor comprising the stator and the rotor is blocked.

12. The linear drive mechanism of claim 1, wherein the casing is of a structure with openings at both ends; and the casing, the front cover, and the rear cover are connected into a single unit by bolts.

13. The linear drive mechanism of claim 1, wherein the casing comprises a front section casing and a rear section casing; the rear section casing is fused into the rear cover as a single unit; and the front cover, the front section casing, and the rear cover fusing the rear section casing are connected into a single unit by bolts.

\*    \*    \*    \*    \*